(12) United States Patent
Gelman et al.

(10) Patent No.: US 12,244,630 B2
(45) Date of Patent: Mar. 4, 2025

(54) SECURITY THREAT ALERT ANALYSIS AND PRIORITIZATION

(71) Applicant: Sophos Limited, Abingdon (GB)

(72) Inventors: Ben Uri Gelman, Burlington, MA (US); Salma Taoufiq, Budapest (HU); Konstantin Berlin, Potomac, MD (US); Tamás Vörös, Budapest (HU)

(73) Assignee: Sophos Limited, Abingdon (GB)

( * ) Notice: Subject to any disclaimer, the term of this patent is extended or adjusted under 35 U.S.C. 154(b) by 177 days.

(21) Appl. No.: 17/958,147

(22) Filed: Sep. 30, 2022

(65) Prior Publication Data

US 2023/0362184 A1 Nov. 9, 2023

Related U.S. Application Data

(60) Provisional application No. 63/390,913, filed on Jul. 20, 2022, provisional application No. 63/339,908, filed on May 9, 2022.

(51) Int. Cl.
*H04L 9/40* (2022.01)
(52) U.S. Cl.
CPC ................................ *H04L 63/1433* (2013.01)
(58) Field of Classification Search
CPC .................................................. H04L 63/1433
USPC ......................................................... 726/25
See application file for complete search history.

(56) References Cited

U.S. PATENT DOCUMENTS

| 9,548,987 | B1 | 1/2017 | Poole |
| 2018/0219888 | A1 | 8/2018 | Apostolopoulos |
| 2020/0004957 | A1 | 1/2020 | Chamaraju et al. |
| 2023/0336586 | A1* | 10/2023 | Sopan .................... G06F 18/24 |

OTHER PUBLICATIONS

Mathenge, Impact, Urgency & Priority: Understanding the Matrix, Jan. 1, 2020, BMC Blogs, https://www.bmc.com/blogs/impact-urgency-priority/ (Year: 2020).*
Laszka, et al. "A Game-Theoretic Approach for Alert Prioritization" AAAI Workshops, 2017.
(Continued)

*Primary Examiner* — Zi Ye
(74) *Attorney, Agent, or Firm* — Schmeiser, Olsen & Watts LLP; Timothy P. Collins

(57) ABSTRACT

A method for prioritizing security events comprises receiving a security event that includes security event data having been generated by an endpoint agent based on a detected activity, wherein the security event data includes one or more features; applying a first computing model to the security event data to automatically determine which of the one or more features are one or more input features to a machine learning system; applying a second computing model to historical data related to the security event data to determine time pattern information of the security event data as an input to the machine learning system; combining the one or more input features from the first computing model and the input from the second computing model to generate a computed feature result; and generating an updated security level value of the security event from the computed feature result.

20 Claims, 7 Drawing Sheets

(56) References Cited

OTHER PUBLICATIONS

Schlenker, et al. "Towards a game-theoretic framework for intelligent cyber-security alert allocation" Proceedings of the 3rd IJCAI workshop on Algorithmic Game Theory, Melbourne, Australia, 2017, updated version. https://teamcore.seas.harvard.edu/publications/towards-game-theoretic-framework-intelligent-cyber-security-alert-allocation-0.

McElwee, et al. "Deep learning for prioritizing and responding to intrusion detection alerts" MILCOM 2017, 2017 Military Communications Conference, pp. 1-5, IEEE.

Bierma, Michael, JD Justin E. Doak, and Corey Hudson, "Learning to rank for alert triage" 2016 IEEE Symposium on Technologies for Homeland Security (HST), pp. 1-5.

Agrawal, Tanay "The Best Feature Engineering Tools—Neptune. Ai" 2022, Neptune.Ai. https://neptune.ai/blog/feature-engineering-tools.

Breiman, Leo "Random forests." Machine learning 45, No. 1, pp. 5-32, 2001.

McLean, Mike "2023 Must-Know Cyber Attack Statistics and Tends," Embroker, Jan. 2, 2023. https://www.embroker.com/blog/cyber-attack-statistics/#:~:text-Cyber%20attacks%20have%20been%20rated,expected%20to%20double%20by%202025.

"SOC as a Service Market Size Share, Industry Analysis by 2022-2023" MarketsandMarkets, May 2022. https://www.marketsandmarkets.com/Market-Reports/soc-as-a-service-market-31262563.html.

Sopan, et al. "Building a Machine Learning Mode for the SOC, by the Input from the SOC, and Analyzing it for he SOC" 2018 IEEE Symposium on Visualization for Cyber Security (VixSec), pp. 1-8.

Chen, Tianqi and Carlos Guestrin "Xgboost: A scalable tree boosting system" Proceedings of the 22nd ACM SIGKDD international conference on knowledge discovery and data mining, pp. 785-794, 2016.

Pedregosa, et al. "Scikit-learn: Machine learning in Python" the Journal of Machine Learning Research 12, pp. 2825-2830, 2011.

Lundberg, Scott M and Su-In Lee "A unified approach to interpreting model predictions" Advances in neural Information processing systems 30, 2017.

Aminato, et al. "Threat Alert Prioritization using Isolation Forest and Stacked Auto Encoder with Day-Forward-Chaining Analysis" Dec. 2, 2020, IEEE Access, vol. 8, pp. 217977-217986.

Hassan, et al. "NoDoze: Combatting Threat Alert Fatigue with Automated Provenance Triage," Network and Distributed Systems Security (NDSS) Symposium, Feb. 2019.

Han, et al. "DeepAID: Interpreting and Improving Deep Learning-based Anomaly Detection in Security Applications," 2021, ACM SIGSAC Conference on Computer and Communications Security, pp. 3197-3217.

Vaarandi, Risto "A Stream Clustering Algorithm for Classifying Network IDS Alerts," 2021 IEEE International Conference on Cyber Security and Resilience.

Maarof, Mohd Aizaini "Classifying Security Alerts from Multiple Sensors based on Hybrid Approach," Jan. 2012, The International Conference on Informatics & Applications, pp. 174-181.

Pietraszek, Tadeusz "Using Adaptive Alert Classification to Reduce Flase Positives in Intrusion Detection," 2004, International Workshop on Recent Advances in Intrusion Detection, pp. 102-124.

Kiflay, et al. "A Network Intrusion Detection System Using Ensemble Machine Learning," IEEE 2021 International Carnahan Conference on Security Technology.

Goeschel, Kathleen "Reducing Flase Positives in Intrusion Detection Systems using Data-Mining Techniques Utilizing Support Vector Machines, Decision Trees, and Naive Bayes for Off-Line Analysis," IEEE SoutheastCon 2016.

Zhao, et al. "Automatically and Adaptively Identifying Severe Alerts for Online Service Systems," Jul. 2020, IEEE Conference on Computer Communications.

Hu, et al. "False Positive Elimination in Intrusion Detection Based on Clustering," 2015 12th International Conference on Fuzzy Systems and Knowledge Discovery, pp. 519-523.

Feng, et al. "A User-Centric Machine Learning Framework for Cyber Security Operations Center," 2017 IEEE International Conference on Intelligence and Security Informatics, pp. 173-175.

Vielberth, et al. "Security Operations Center: A Systematic Study and Open Challenges," Dec. 17, 2020, IEEE Access, vol. 8.

Wang, et al. "Identifying Truly Suspicious Events and False Alarms based on Alert Graph," 2019 IEEE International Conference on Big Data, pp. 5929-5936.

Ban, et al. "Combat Security Alert Fatigue with AI-Assited Techniques," Aug. 9, 2021, Cyber Security Experimentation and Test Workshop, Virtual, CA.

"The Cost of Cybercrime: Ninth Annual Cost of Cybercrime Study," 2019, Accenture.

Verma, et al. "An Unstructured to Structured Data Conversion using Machine Learning Algorithm in Internet of Things (IoT)" 2020, 3rd International Conference on Innovative Computing and Communication.

Lemay, Aurelien "Machine Learning Techniques for Semistructured Data," Université de Lille, 2018.

Giulio, et al. "PySiology: a python package for physiological feature extraction," 2019, Springer Nature Singapore Pte Ltd.

Aqajari, et al. "pyEDA: An Open-Source Python Toolkit for Preprocessing and Feature Extraction of Electrodermal Activity" Mar. 2021, The 12th International Conference on Ambient Systems, Networks and Technologies, pp. 99-106.

Christ, et al. "Time Series FeatuRe Extraction on basis of Scalable Hypothesis tests (tsfresh—A Python package)" 2018, Neurocomputing 307, pp. 72-77.

Kanter, James Max and Kalyan Veeramachaneni, "Deep Feature Synthesis" Towards Automating Data Science Endeavors 2015, IEEE International Conference on Data Science and Advanced Analytics, pp. 1-10.

Horn, et al. "The autofeat Python Library for Automated Feature Engineering and Selection" 2019, Workshop on Automating Data Science, Cornell University, pp. 1-11.

Markovitch, Shaul and Dan Rosenstein "Feature Generation Using General Constructor Functions" 2002, Machine Learning, 49, pp. 59-98.

Khurana, et al. "Cognito: Automated Feature Engineering for Supervised Learning" 2016, IEEE 16th International Conference on Data Mining Workshops, pp. 1304-1307.

Bosch, Nigel "AutoML Feature Engineering for Student Modeling Yields High Accuracy, but Limited Interpretability" 2021, Journal of Educational Data Mining, vol. 13, No. 2, pp. 55-79.

Prashad, Shiv "Cyber security operations centre ML framework for the needs of the users" 2021, International Journal of Machine Learning for Sustainable Development, abstract.

"Alteryx/featuretools" GitHub repository, https://github.com/alteryx/featuretools, 2022.

"Auto JSON Parsing—Coralogix". 2022. Coralogix. https://coralogix.com/docs/auto-json-parsing/.

"Dynamic Parsing". 2022. Sumo Logic. https://help.sumologic.com/05Search/Get-Started-with-Search/How-to-Build-a-Search/Dynamic_Parsing.

Bahmani, MJ. 2022. "A Quickstart Guide to Auto-Sklearn (Automl) for Machine Learning Practitioners—Neptune.Ai". Neptune.Ai. https://neptune.ai/blog/a-quickstart-guide-to-auto-sklearn-automl-for-machine-learning-practitioners.

Grawal, Tanay. 2022. "The Best Feature Engineering Tools—Neptune.Ai". Nep-tune.Ai. https://neptune.ai/blog/feature-engineering-tools.

International Search Report and Written Opinion in PCT/GB2023/051192 mailed on Jul. 27, 2023.

Gelman, et al. "That Excalated Quickly: An ML Framework for Alert Prioritization" ARXIV.org, Cornell University, Feb. 13, 2023.

International Preliminary Report on Patentability in PCT/GB2023/051192 mailed on Nov. 21, 2024.

\* cited by examiner

SECURITY THREAT ALERT ANALYSIS AND PRIORITIZATION

CROSS-REFERENCE TO RELATED APPLICATIONS

This application claims priority under 35 U.S.C. § 119 from U.S. Provisional Patent Application Ser. No. 63/339,908 filed on May 9, 2022 entitled "SECURITY THREAT ALERT ANALYSIS AND PRIORITIZATION" and U.S. Provisional Patent Application Ser. No. 63/390,913 filed on Jul. 20, 2022 entitled "SECURITY THREAT ALERT ANALYSIS AND PRIORITIZATION," the entire contents of each of which are hereby incorporated by reference.

FIELD

The present disclosure relates to generally to evaluating security events generated by computer endpoint agents monitoring for potential security threats to one or more client computing devices within a networked environment. More specifically, the present disclosure describes systems and methods for valuating and prioritizing security events generated by the endpoints.

BACKGROUND

A security technique used by enterprises for protecting computer networks against malicious cyberattacks such as ransomware, malware, phishing, and so on, is to rely on a managed threat response team, which proactively identifies and prevents potential security threats, and in doing so receive and process billions of events collected by monitoring a customer's computer network. The team analysts may each receive a set of threat cases including collected suspicious events for analysis. The events can be prioritized according to their security risk. In doing so, each event may be provided with a severity level value established by a user-defined ruleset. For example, an event may have a high severity value when a determination is made that a file of interest has been modified or otherwise affected by malware or the like.

However, an analyst's case load may include events that are presented in an order to the analyst where a first event, e.g., at the top of the list of events in the case load, is benign as compared to a second event that identifies potential malware because the first event was assigned a high severity level value when it should have been assigned a lower severity level value than that of the second event. In this example, significant but unnecessary analyst time and effort may be applied to analyze the first event instead of the second event. Also, an analyst can be inundated with false positive alerts, or events on which a detector has fired. The analyst must still analyze these alerts to confirm any malicious activity, which can further result in time-consuming efforts. Thus, an automated computer system, computer program product, and method for valuating and prioritizing security events generated by endpoints of a computer network that address and overcome the foregoing would be well received in the art.

SUMMARY

According to embodiments disclosed herein, a method, and associated computer system and computer program product for prioritizing security events. According to the method, one or more processors of a computer system receives a plurality of alerts generated by an endpoint agent response to a detected computer security activity. A plurality of feature vectors is extracted from the plurality of alerts. A plurality of temporal features are computed from the plurality of alerts. A first classification model is trained with the plurality of feature vectors. A second classification model is trained with the plurality of temporal features. The first classification model and the second classification model are combined to generate an ensemble model. An alert-level risk score corresponding to a severity-level value is output from the ensemble model for each alert of the plurality of alerts. The plurality of alerts is arranged for output to an analyst computer according to the alert-level risk scores.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
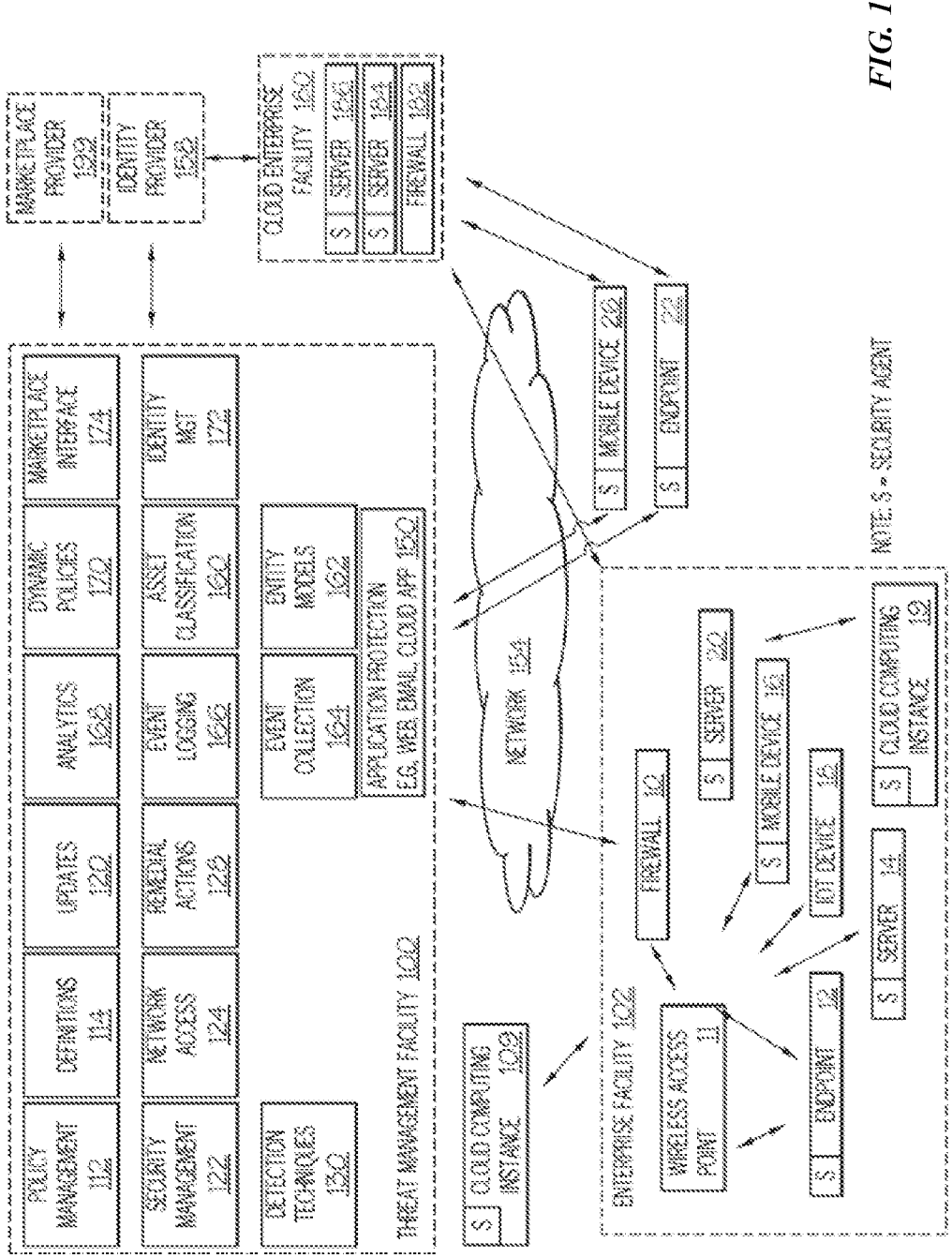
FIG. 1 is a block diagram of a threat management facility according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The disclosed concepts and features are described in more detail with reference to exemplary embodiments thereof as shown in the accompanying drawings. While the various concepts and features are described in conjunction with various embodiments and examples, it is not intended that the concepts and features are limited to such embodiments. On the contrary, the various concepts and features encompass various alternatives, modifications and equivalents, as will be appreciated by those of skill in the art. Those of ordinary skill having access to the concepts described herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a block diagram of a threat management system 100 providing protection against a plurality of threats, such as malware, viruses, spyware, cryptoware, adware, Trojans, spam, intrusion, policy abuse, improper configuration, vulnerabilities, improper access, uncontrolled access, and more according to an example embodiment. The threat management facility 100 may communicate with, coordinate, and control operation of security functionality at different control points, layers, and levels within the system 100. A number of capabilities may be provided by the threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats or unwanted activity. In embodiments, the threat management facility 100 may provide protection from a variety of threats or unwanted activity to an enterprise facility that may include a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or TOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with a cloud enterprise facility 180. The cloud enterprise facility may include one or more cloud applications, such as a SaaS application, which is used by but not operated by the enterprise facility 102. Exemplary commercially available SaaS applications include Salesforce, Amazon Web Services (AWS) applications, Google Apps applications, Microsoft Office 365 applications and so on. A given SaaS application may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

The cloud enterprise facility 180 may include servers 184, 186, and a firewall 182. The servers 184, 186 on the cloud enterprise facility 180 may run one or more enterprise or cloud applications, such as SaaS applications, and make them available to the enterprise facilities 102 compute instances 10-26. It should be understood that there may be any number of servers 184, 186 and firewalls 182, as well as other compute instances in a given cloud enterprise facility 180. It also should be understood that a given enterprise facility may use both SaaS applications and cloud enterprise facilities 180, or, for example, a SaaS application may be deployed on a cloud enterprise facility 180.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware.

Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
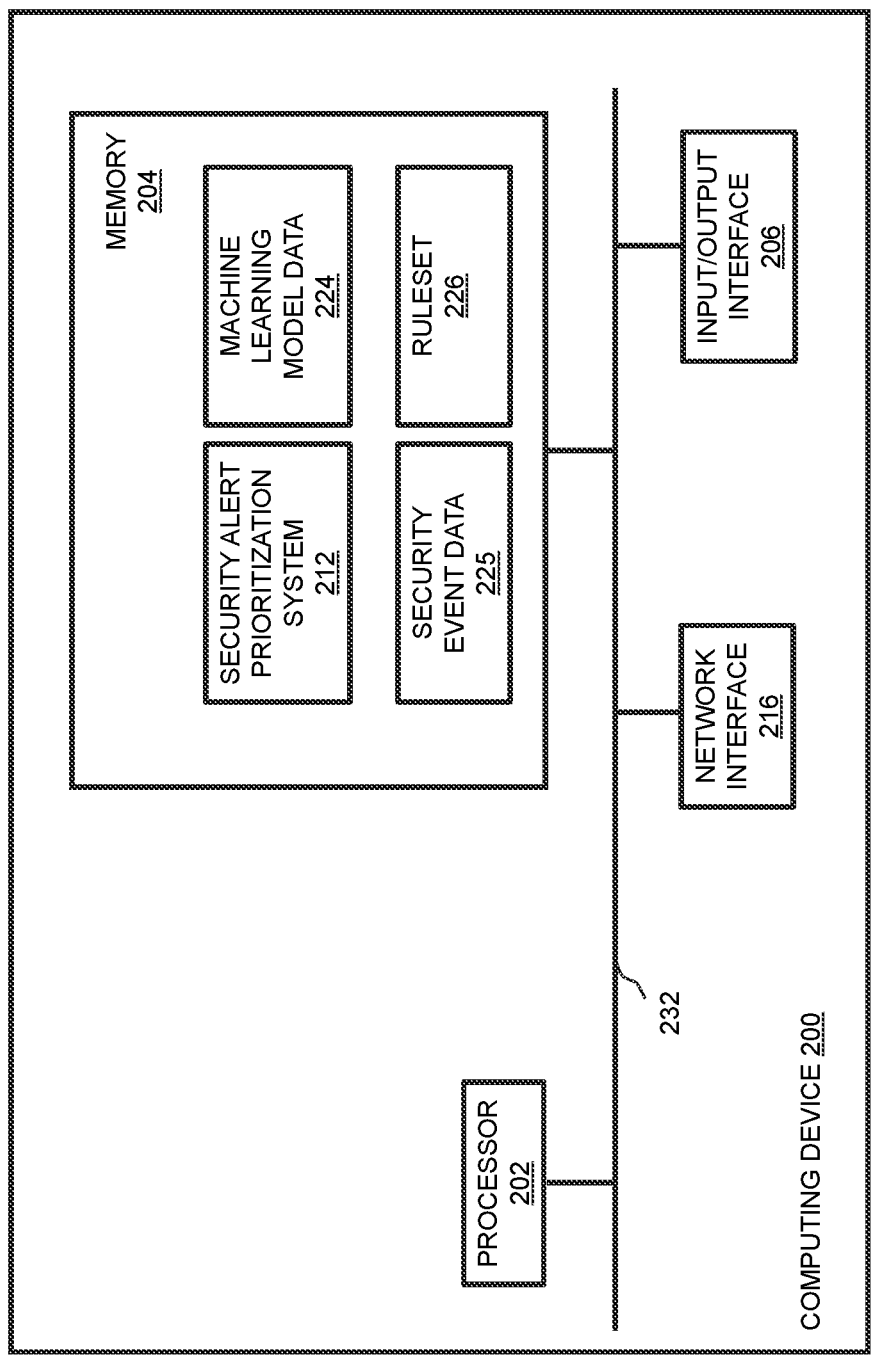
FIG. 2 is a block diagram of a computing device in which embodiments can be practiced.

FIG. 2 is a block diagram of a computing device 200 in which embodiments can be practiced. In general, the computing device 200 may be, for example, a hardware-based computing device such as a laptop computer, desktop computer, workstation, server, and so on, but not limited thereto in some embodiments, the computing device 200 may provide a physical or virtual device as a platform for any of the entities described in a threat management environment herein with reference to FIG. 1. For example, the computing device 200 may be a server, a client, a threat management facility, or any of the other facilities or computing devices described therein. In certain aspects, the computing device 200 may be implemented using hardware (e.g., in a desktop computer), software (e.g., in a virtual machine or the like), or a combination of software and hardware (e.g., with programs executing on the desktop computer). The computing device 200 may be a standalone device, a device integrated into another entity or device, a platform distributed across multiple entities, or a virtualized device executing in a virtualization environment. The computing device 200 may also or instead be any suitable device that has processes and communicates over a network via an input/output (I/O) interface 206 such as a transceiver, Ethernet port, WiFi apparatus, or other electronic network communication medium logic. This may include public networks such as the Internet, private networks, and telecommunications networks such as the Public Switched Telephone Network or cellular networks and/or other technologies, as well as any of a variety of corporate area, metropolitan area, campus or other local area networks or enterprise networks, along with any switches, routers, hubs, gateways, and the like. The network (not shown) may also include a combination of data networks and need not be limited to a strictly public or private network. Accordingly, the computing device 200 may be without limitation a laptop computer, a desktop computer, a personal digital assistant, a tablet, a mobile phone, a television, a set top box, a wearable computer (e.g., watch, jewelry, or clothing), an electronic home device (e.g., a thermostat or a home appliance controller), just as some examples.

The computing device 200 includes a processor 202, a memory 204, and an input/output (I/O) interface 206, which can exchange data and/or other electronic communication via a wired or wireless bus (not shown). The computing device 200 may include other hardware and/or software components such as a bus, peripheral interface, and so on, which are not illustrated and described for brevity.

The processor 202 may be general purpose or special purpose hardware and/or software based integrated circuit (IC) or the like configured to execute a set of instructions or code stored in the memory 204 to perform predetermined tasks. In some embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

The memory 204 can store, for example, code of one or more software applications, modules, programs, or the like includes instructions to cause a processor 202 to perform one or more processes, functions, and/or the like. For example, the memory 204 may store information within the computing device 200 and/or software components that are part of the threat management facility 100 of FIG. 1. The memory 204 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 204 may, in general, include a non-volatile computer readable medium containing computer code that, when executed by the computing device 200 creates an execution environment for a computer program in question. The processor 202 may be any as described herein, and may generally be capable of processing instructions for execution within the computing device 200. The processor 202 may include a single-threaded processor or a multi-threaded processor. The processor 202 may be capable of processing instructions stored in the memory 204 and/or data storage device (not shown).

In some embodiments, the memory 204 may store instructions or code of a security alert prioritization system 212, which can be executed by the processor 202 to receive and process machine learning model data 224 and security event data 225 generated by an endpoint monitoring for potential security threats at an enterprise facility, for example, a customer computer network in connection with the threat management facility 100 of FIG. The memory 204 may also store security event data such as binary images, object code, portable executable (PE) files, macros, scripts, and so on. Accordingly, events may relate to computer activity performed by event data. In some embodiments, alert data has a semi-structured format or open source data format or interchange for semi-structured data, such as Java Script Object Notation (JSON), structured query language (SQL), and so on. In some embodiments, the file can be a document file, e.g., HTML, XML, or the like. Text-based semi-structured messages or events, arranged in a JSON format, may include schema that can be modified. In some embodiments, a feature processor, for example, shown in FIG. 3, can process data from new detectors. For example, a user computer may execute a security application that executes a new detector to generate a threat score or current security level value of the corresponding alert that can be received by the security alert prioritization system 212 as part of the content of an event. The automatic feature framework can adapt to the new detector in a similar manner as the semi-structured alert data, changes in schema, or other event-related inputs.

The memory 204 may also store machine learning model data 224. The machine learning model data 224 may include data generated by one or more machine learning models during processing of the security event data 225. The machine learning model data 224 stored by the memory 204 may include security event features or the like. For example, as described herein, the machine learning model data 224 may include a first machine learning model, e.g., including or part of a content computing model, that communicates with the security alert prioritization system 212 to identify features of interest from the content of raw detection data, apply an automatic feature framework to an input event of interest, and combine the output with orthogonal information derived by a second machine learning model from the context in which the computer environment of the input file is determined. The second machine learning model may include orthogonal information that provides historical context with respect to the event. In some embodiments, the memory 204 may store machine learning model data 224 of a neural network, Random Forest, distributed gradient-boosted decision tree (GBDT) machine learning library such as XGBoost or other suitable model, but not limited thereto. In some embodiments, the security alert prioritization system 212 can generate a computed feature result from the two machine learning models which in turn is used to generate a threat classification such as a severity level value, threat score, or the like used for prioritizing security events generated by enterprise endpoints. For example, a severity level value may classify events of interest into different categories such as benign, potentially malicious, malicious, and so on. In some embodiments, a computed feature result or alert-level or incident-level score generated by the security alert prioritization system 212 can be used to augment or replace a current severity level, threat score, or the like generated according to a user-defined ruleset 226, which may also be stored in the memory 204.

The I/O interface 206 may be a hardware device operatively coupled to the processor 202 and memory 204. For example, the I/O interface 206 may transmit stored event data 225 from the memory 204 to the processor 202. In some embodiments, the I/O interface 206 communicates with a with a data network or the like via a network interface card (NIC), a. Wi-Fi™ module, a Bluetooth® module and/or any other suitable wired and/or wireless communication device.

The network interface 216 may include any hardware and/or software for connecting the computing device 200 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 200 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 200 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection using, e.g., CDMA, GSM, LTE, 5G, or any other suitable protocol or combination of protocols. The network interface 216 may be included as part of the I/O interfaces 206 or vice-versa.

A bus 232 or combination of busses may serve as an electromechanical platform for interconnecting components of the computing device 200 such as the processor(s) 202, memory 204, I/O interface(s) 206, and network interface 216.

Figure 3:
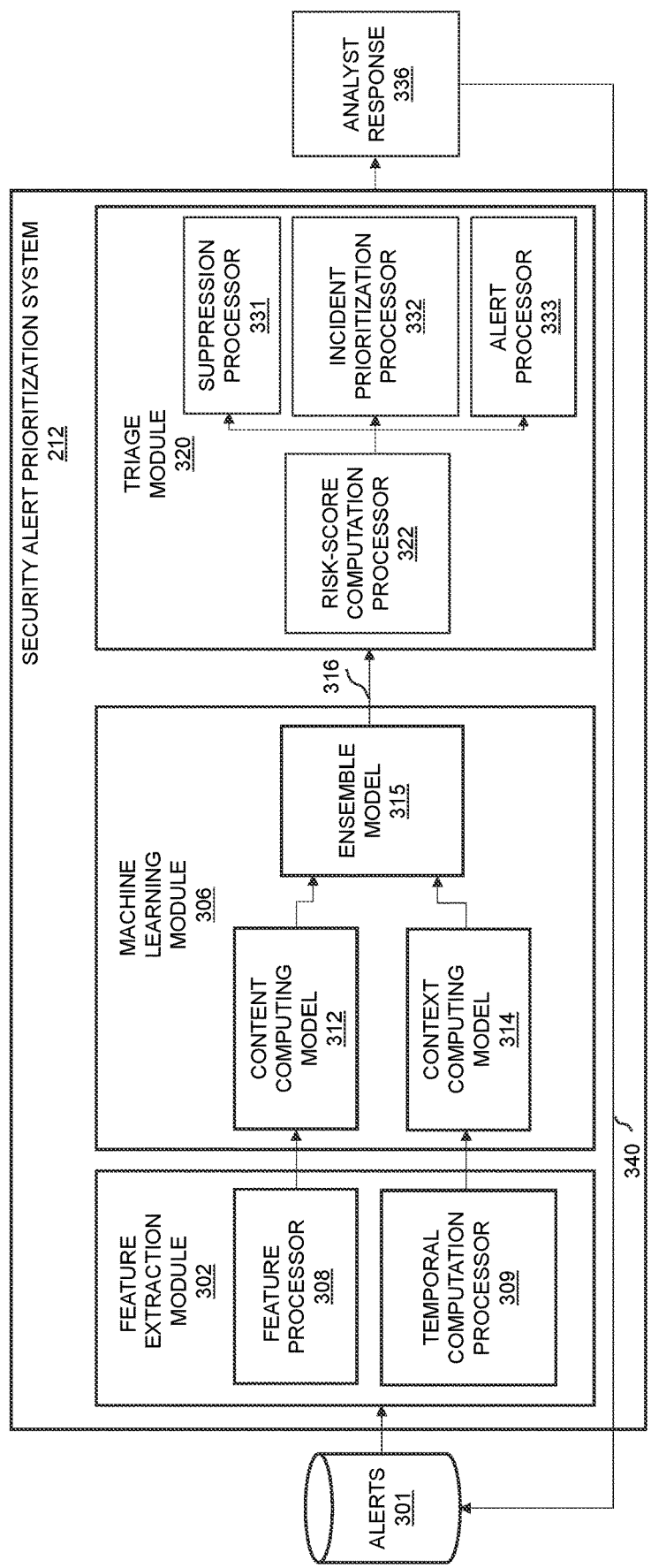
FIG. 3 is a schematic diagram of a security alert prioritization system, in accordance with an example embodiment.

FIG. 3 is a schematic diagram of a security alert prioritization system 212, in accordance with an example embodiment. The security alert prioritization system 212 can address issues that exacerbate alert fatigue associated with analysts overwhelmed with case loads, such issues including the large collections of imprecise sensors such as firewalls, intrusion detection systems, and so on, adapting to false positives, the evolving cyberattack landscape, and inefficient use of analyst time.

In some embodiments, the security alert prioritization system 212 includes a feature extraction module 302 and a machine learning module 306. In other embodiments, the security alert prioritization system 212 also includes a triage module 320. The feature extraction module 302, machine learning module 306, and triage module 320 can be part of a same machine, for example, as shown in FIG. 2, or may be on separate machines, for example, different processors, memories, and the like, and in communication with each other via one or more busses, wireless connections, and so on.

The feature extraction module 302 includes a feature processor 308 that executes an automatic featurization process for operating on, e.g., validating, semi-structured event files, alerts and/or other input-level representations stored at an alerts database 301. Here, the feature processor 308 can extract the contents of the incoming raw, semi-structured input-level representations and encode each alert as a feature vector for output to the machine learning module 306. Sensors such as network intrusion detection systems (NIDS), antivirus, firewalls, log parsing software, or the like may generate false positives. In addition, these sensors can be inconsistent in the processing of data that they collect and the manner in which the data is formatted. Therefore, employing multiple sensors in a network can result in missing data and high maintenance costs. The feature extraction module 302 can automatically parse semi-structured data from arbitrary collections of sensors, handle missing values, and validate the feasibility of inputs to machine learning models. The feature processor 308 can provide a first input to the machine learning module 306, and more specifically, to a content computing model 312. The feature extraction module 302 also includes a temporal computation processor 309 that examines historical trends among customers and their computer endpoints and computes temporal features for each alert in parallel to the automatic featurization process performed by the feature processor 308 on the alerts. The alerts database 301 may store historical context data such as customer vulnerability and alert activity patterns, detection sensor activity, computer activity and behavior patterns, and so on, which can be combined with the semi-structured input-level representations to mitigate the risk of false alarms when generating a security level value for an event. The context data can be captured from various data sources having information regarding customer vulnerability and alert activity and behavior patterns, computer network size, configuration, state, detection sensor activity, computer activity, and so on. The temporal computation processor 309 can provide a second input to the machine learning module 306, and more specifically, to a context computing model 314.

As previously described, the feature processor 302 of the feature extraction module 302 is configured to receive one or more semi-structured event files from the alerts database 301, that include information about computing activity on an endpoint and including content from a detection of possible malware or other security-related data for malicious purposes. In some embodiments, the semi-structured data is provided from arbitrary sensors without a predefined schema. Example sensors may include network intrusion detection systems (NIDS), antivirus, firewalls, log parsing software, or other security hardware and/or software devices configured to detect suspicious activity such as potential cyberattacks against a computer or network of computers. In some embodiments, the alerts database 301 may store event data that is in a JSON format. A JSON file is well-known for including object features formed of keys and values arranged in a key-value data format. Different events can have different key-value pairs. A received event may include missing keys, or include keys added as security appliances change or added or removed by an analyst. Other content examples may include but not be limited to process names, command lines, machine language scores, file paths, operating system information, event descriptions, and so on.

In some embodiments, the feature processor 308 first automatically analyzes the types, quantities, and distributions of raw alert data from the alerts database 301 in order to construct and refine feature vectors that are provided to the content computing model 312 of the machine learning module 306 as input. This allows the system's training and deployment pipeline to adapt to new alert types and schema changes without human intervention. The feature processor 308 can include an automatic featurization framework that acts directly on the event file content from raw detections so that the input events are processed in a format sufficient for receipt and processing by the content computing module 302.

The automatic featurization framework applies the following steps to convert semi-structured alerts received from the alerts database 301 by the feature extraction module 302 to validated feature vectors. First, the framework can accept arbitrarily structured JSON files and follows a flattening procedure to identify all of the keys. Nested keys can be prefixed by the key in which they are contained. All unique keys can be tracked throughout the parsing procedure. A NaN (not a number) value in a JSON string can be assigned as the value for any key that does not exist within a given JSON file. This results in a sparse table where each row corresponds to data of an alert. The columns of the table are defined by the unique keys, populated by the available values that are in the alert JSONs and NaNs for the missing values. Next, a validation process can be performed on the data to ensure that it is a viable input to the machine learning module 306. For example, in the validation process, columns that contain identifier language such as "id" or "time" can be removed because these are not features that will generalize to test data. The feature processor 308 can parse the columns. In some embodiments, numerical types can be replaced with −1, for example, to avoid mixing data types. In some embodiments, NaNs are replaced for strings or object types. All of the remaining string fields may have their NaNs replaced with the string "missing val" to once again unify the data type within the column. Because strings can have an immense long tail of possible values, the data must be useful when training the machine learning models. Other forms of information may equally apply, for example, entropy to which a threshold may be applied. In other examples, the feature processor 308 can compute the count of unique values in each column, e.g., count the unique occurrences of the corresponding values of the key-value pairs. In some embodiments, a tunable threshold process is applied to replace any string that falls below a threshold, for example, including the string "rare_val" or the like. A threshold parameter may be compared to the number of key occurrences. For example, a parameter may be part of an exclusion system executed by the feature processor 308 to establish that key is not to be processed by the feature processor 308 if the number of unique occurrences of a given key is less than 50, or if the key has less than five unique values. Although this may remove some information from the column, it also prevents noise from flooding the model training. Additionally, a "rare_val" string often becomes an indicator for an anomalous reading. The threshold can be tuned along with other model hyperparameters. Finally, a uniqueness check process can be performed that removes any string columns that only have one or two unique values.

In some embodiments, the key-value pairs can be processed in a modular manner according to type so that particular modular key types can be added, replaced, or modified without affecting the rest of the configuration. For example, the exclusion system can be configured to process previously known keys, for example, to determine whether a key should be removed or otherwise prevented from further processing by the machine learning module 306. In another example, keys that contain unique identifiers, timestamps, or the like can be excluded. In another example, keys that include floating points or the like can receive a value of −1 if they are missing, and then all the values are normalized. In another example, keys that contain integers can receive a value of 0 if they are missing. In another example, keys that contain strings can be processed by the feature processor 308 having a configuration such that all keys that have 2 or fewer unique values are excluded, and the strings are then one-hot encoded. In another example, keys that contain strings can be processed by the feature processor 308 having a configuration such that the keys can be passed through a character-level or token-level encoder. Since the keys and/or values in these examples can be processed in a modular manner, the security alert prioritization system 212 can be programmed to process the key-value pairs according to a particular ruleset 226 based on the type, number of key occurrences, or other metric(s).

The temporal computation processor 309 can provide context classification data to the machine learning module 306 that tracks data across the entirety of a security operations center (SOC), for example, shown in FIG. 1. Context data can be captured from various data sources having information regarding customer vulnerability and alert activity patterns, computer network size, configuration, state, etc., detection sensor activity, and so on. The alerts database 301 can store, and the temporal computation processor 309 can process and analyze captured real-time trends, such as customer estate size, customer and endpoint vulnerability, alert activity patterns, and sensors' firing activity. Several temporal features and summary statistics over numerous granularity time windows are used to encapsulate these behavioral signals. This data is capable of capturing information such as sudden anomalous peaks in alert volume that may indicate sensor noise or misconfigurations. Event features can be computed by the temporal computation processor 309 based on different time windows and predicates over various time periods. This is performed to capture activity at different levels of temporal granularity, for example, time patterns measured in seconds, hours, weeks, and so on resulting in a plurality of numerical features. Possible predicates may include but not be limited to a count of alerts on a customer's estate, count of alerts on an endpoint, average and median alert severity scores for alerts fired for an endpoint, count of sensors that have fired on a customer's network, count of customer endpoints whose activity triggered alerts, count of endpoints for which a sensor has fired, count of customers on whose estates a sensor has fired, count of alerts fired by a given sensor, and/or count of alerts triggered on a customer's network by a given sensor.

For example, a customer-specific metric may include the number of different detector types that have fired for a given customer over the previous hour. An example of a machine-specific metric may include a number of alerts encountered on a given machine over the previous hour. An example of a detection type-specific metric may include a number of different customers for which a given detector type has fired over the previous hour. An example of a customer and detection type-specific metric may include a number of alerts from a given detector type fired for a given customer over the previous hour. An example of a global context metric may include a number of different customers having enterprises that produced alerts over the previous hour.

As described above, the machine learning module 306 can apply three models to produce a risk score corresponding to a severity level value for each alert: a content model 312 that relies on features extracted from alert data to produce a content-base classifier, a context model 314 that classifies alerts based on temporal features, and an ensemble model 315 that fuses them together. In some embodiments, a linear based classification algorithm, such as Logistic Regression, can be performed on the content model 312 and the context model 314. In other embodiments, tree-based ensemble methods may be performed, for example Random Forest or XGBoost. The content model 312 can act directly on alert feature vectors from the automatic featurization framework of the feature processor 308. The context model 314 can act on the feature vector from the temporal context computation. More specifically, the context model 314 relies on behavioral analysis to develop context around alerts. Instead of considering alerts as point-in-time stateless entities, the context model 314 aggregates information within a global historical context. The two models 312, 314 can be combined, or ensembled, to generate a comprehensive risk score, which is an alert-level value that incorporates stateless alert data and stateful, temporal context. In particular, the ensemble model 315 generates a comprehensive risk score by combining the outputs of the content model 312 and the context model 314, which can include a unique per-alert value that incorporates a myriad of stateful and temporal stateless patterns.

In some embodiments, a statistical analysis may be performed to identify event features from the security event data are selected by the content computing model 312 for input to the ensemble model 315. For example, a set of events may be received and analyzed to identify features of interest. A feature of interest may be present in other events. A machine learning algorithm can be used to train the features produced by the statistical analysis process. For example, a statistical analysis process applied to the security event data may establish that a feature of possible interest may be missing from an event received by the content computing model. However, the system can determine from other events or other data analyzed by the statistical analysis processed that the feature of interest is required and can add the feature for identification and processing by the ensemble model 315. Similarly, a feature may be identified as not relevant to generating a threat score or the like, and can be removed in response to a statistical process. Although a statistical analysis process is described by way of example, featurization processes are not limited thereto. In some embodiments, the identified features of an event, e.g., strings, elements, subtrees, tags, function calls, etc., can be used to form a feature vector representative of and/or indicative of the event features that is provided as an input to the ensemble model 315.

For example, event features identified by the content computing model 312 may not warrant a high-severity alert because no specific malware is detected. However, the context model 314 may capture information from a combination of detectors, alert activity patterns or the like, i.e., received and processed by the temporal computation processor 309, to establish that the features of interest warrant a high-severity alert. In some embodiments, processed event features may be used by a reputation-based security system for generating statistics or other information used for identifying potential threats. Accordingly, the context model 314 is configured to generate features provide an input layer to the ensemble model 306 that is orthogonal to an input layer of the content computing model 312. The context model 314 is unique from the content computing model 312 in that it operates on historical data by accumulating information over time windows.

In some embodiments, the ensemble model 315 may generate a computed feature result according to a modular aggregation technique. For example, the ensemble model 315 can calculate the average of task results determined by the content computing model 312 and context computing model 314 respectively. In another example, the ensemble model 315 can generate the risk score to improve the system's predictive performance by taking the average of the predictions and the maximum of the predictions, computing a weighted sum of the predictions, and/or training a unified model on the features of both the content model 312 and context model 314. Other aggregation techniques can be performed such as mean, minimum, maximum, any other statistical aggregation, or any other ensemble/voting algorithm, but not limited thereto. An aggregation technique according to predetermined preferences can be selected during training or tuning of the models 312, 314. For example, prior to training, the ensemble model 315 may generate an updated threat score from the content computing model 312 and context computing model 314 respectively. However, ensemble model 315 may be retrained to calculate an updated risk score for an alert according to a different aggregation technique, for example, instead selecting the highest threat score value instead of calculating a mean of the risk scores for the alerts. In doing so, an algorithm such as logistic regression, Random Forest, or XGBoost can be applied. For example, a Random Forest algorithm may be applied to a content computing model 312 and XGBoost algorithm can be applied to a context computing module 314.

The models 312, 314, 315 of the machine learning module 306 act on individual alert levels. The triage module 320 is configured to aggregate the alert-level risk scores generated by the machine learning module 306 then to obtain incident-level scores before performing any of three functions: false positive suppression, incident prioritization, and within-incident alert prioritization. SOC analysts are provided with a listing of cybersecurity-based incidents so that they may be resolved. The triage module 320 may generate an incident-level score that can provide information in the form of false positive suppression, incident prioritization, and within-incident prioritization. In some embodiments, alert-level scores output by the machine language module 306 can be translated by the triage module 320 to incident-level scores by processing the maximum, mean, or median of scores of a given incident's constituent alerts, which allows analysts to investigate incidents rather than individual alerts. In order to translate a group of alert-level risk scores into a single incident-level score, one or more different aggregation strategies may be applied. False positive suppression may include the suppression of incidents with an incident-level score that is below an empirically chosen threshold. Suppression can provide a single tunable threshold to eliminate false positives, while reducing the need for tuning hundreds of sensors, also referred to as detectors, and pre-generated rules. A diverse set of orthogonal detectors may be implemented in a threat management environment to provide for the holistic diagnosis and protection of the customers of an SOC. However, this can result in detectors requiring different detection rules which can result in varying alerts, false positives, and the like. As described herein the content computing module 302 can adapt to underlying changes in processing data from the different detectors.

Incident prioritization may include the ranking of incidents based on their scores to identify the most critical incidents at the top of the incident queue. Here, an analyst's incident queue, or case load, displayed at the analyst response system 336 can be rearranged so that incidents that are most likely to be malicious are presented at the top of the queue.

Within-incident alert prioritization may include the use of an incident-level score based on the alert-level risk scores to rank alerts within a given incident using the alert-level scores to guide analysts' investigations.

Accordingly, the machine learning module 306 can be trained to identify false positives using a data-driven approach described above. False positives can frequently be duplicates of incidents previously resolved by analysts. The models 312, 314, 315 do not use hard-coded rules to make predictions and can therefore identify duplicates according to the data received and used to train the models.

The analyst response system 336 can receive and analyze triage module outputs, in particular, an incident-level score that aggregates a plurality of alert risk scores and presents the incident data according to an arrangement that permits the analysts to analyze the data, for example, presenting incidents that are most likely to be malicious at the top of the analyst's queue. For example, the triage module 320 can accumulate alerts occurring around the same time on the same customer endpoint into an incident. Human analysts may use the analyst response system 336 to investigate and respond to each incident, for example, assigning a label whether they had to manually take action to come to a resolution. For example, labels based on incident descriptions may be assigned by an analyst for each alert. An actionable label specifically signals whether the incident was worthy of security analysts' time. Incidents may be categorized as incidents that require any kind of manual remediation are labeled as positives, incidents generated by true positive alerts, i.e., malicious activity occurs, but is successfully contained by automated defense infrastructure, are labeled as negatives, and incidents generated by false alerts, i.e. no malicious activity occurs, are labeled as negatives. For example, incidents that require remediation can be labeled as positive, incidents generated by true positive hits of detectors can be indicative of a malicious activity but be labeled as negatives, and incidents generated by false positive hits of detectors can be indicative of no malicious activity but be labeled as negatives.

A feedback loop 340 may extend from the analyst response system 336 to the alerts database 301, which permits new knowledge acquired from analyst investigations and response regarding alert inspections for malware or the like to be integrated into the system without changes to manual workflows. For example, the outcomes of any incidents that the analysts resolve are automatically propagated back to all of the input alerts, which can then be reprocessed through the feature extraction module 302 and machine learning module 306. Even if an analyst does not write any additional domain knowledge rules in response to an identified new threat, the machine learning models learn to associate existing sensors with the new data. Therefore, the feedback loop 340 does not require any additional effort on the part of analysts beyond their standard incident resolution provided at the analyst response system 336.

Figure 4:
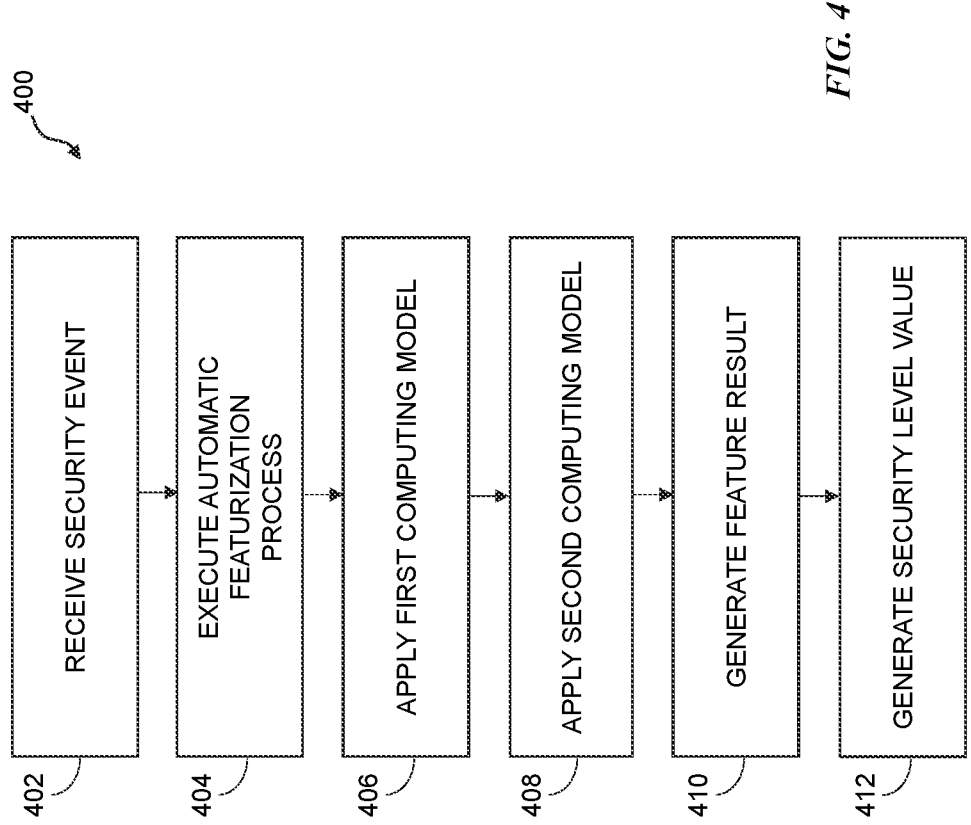
FIG. 4 is a flow diagram of a method for prioritizing security events, in accordance with an example embodiment.

FIG. 4 is a flow diagram of a method 400 for prioritizing security events, in accordance with an example embodiment. The method 400 may be implemented by one or more of the devices, components, and/or systems shown in the accompanying figures, and is discussed by way of reference thereto. In describing the method 400, reference is made to elements of the computing environment of FIG. 1 and the security alert prioritization system 212 of FIGS. 2 and 3.

The method 400 begins at block 402, where the security alert prioritization system 212 receives at least one security event from the alerts database 301. The security event can include data generated by an endpoint monitoring for potential security threats, such as malware.

At block 404, an automatic featurization process is executed by the feature processor 308.

At block 406, a first computing model, e.g., the content computing model 312, can be applied to the security event data to identify features of the security event as input features to the ensemble model 315.

At block 408, a second computing model, e.g., the context computing model 314, can be applied to historical data related to the security event data to determine time pattern information of the security event data for additional input to the ensemble model 315.

At block 410, a computed feature result can be generated by the ensemble model 315 by a combination of the time pattern information received and processed by the second computing model 314 and security event data received and processed by the first computing model 312.

At block 412, the ensemble model 315 can process the computed feature result to generate a severity level value 316, which in turn can provide an alert-level risk score. In some embodiments, the security event value may be a current threat score that is changed to a new threat score in response to receipt and processing of the computed feature result. In some embodiments, the security event value is generated by a combination of threat scores provided by the first computing model and second computing model, respectively. In some embodiments, the security event features determined in block 406 may include a current threat score, and the computed feature result may include a new threat score. In some embodiments, one or more of the content computing model 312, context computing model 314, and machine learning ensemble model 315 can be retrained based on the computed feature result. In some embodiments, the severity level value 316 can be output to the triage module 320 for additional processing, e.g., aggregate severity level values 316 to obtain incident-level scores before performing any of three functions: false positive suppression, incident prioritization, and within-incident alert prioritization.

Figure 5:
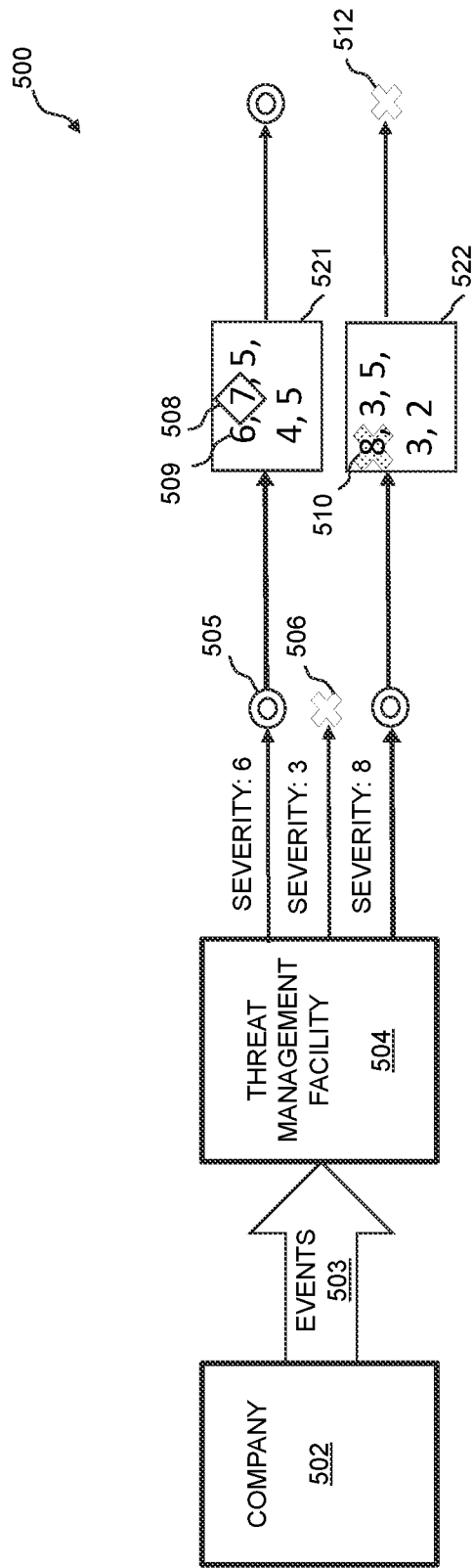
FIG. 5 is a diagram illustrating an operation performed by a security alert prioritization system, in accordance with an example embodiment.

FIG. 5 is a diagram illustrating an environment in which an operation is performed by the security alert prioritization system 212. As shown, a company 502 may retain a threat management facility 504 to analyze security events 503 identified as possible security threats. The threat management facility 504 may be similar to or the same as the threat management facility 100 of FIG. 1 so details thereof are not repeated for brevity. The security events 503 are provided by endpoints monitoring the company's computer environment for potential malicious activity. The events 503 may be output from the alerts database 301 of FIG. 3, for example, in the form of semi-structured event files. In this example shown in FIG. 5, a security analyst at the threat management facility 504 is responsible for managing two threat case loads 521, 522. Each threat case load 521, 522 includes several events. Each security event 503 is assigned a priority, also referred to as a security level value or threat score. For example, a severity level value 3 may identify an event 503 as benign, a severity level value 6 may identify an event 503 as potentially malicious, and a severity level value 8 may identify an event 503 as including malware. A predefined ruleset 226 may establish that events having a severity level value 3 may not be part of a threat case, i.e., blocked ((X) 506) from being added to the threat case. Alternatively, the ruleset 226 may establish that the event having a severity level value 3 or may be positioned at the end of a listing of events in a threat case load, or discarded from being part of the threat case load.

However, some security events may have false positive results. Other events may be overvalued or undervalued. For example, referring to threat case load 521, an event 508 intentionally or unintentionally assigned a severity level value 7 should have been assigned a severity level value 4. The analyst may evaluate the misvalued event having the higher severity level value 7 instead of an accurately valued event, such as an event 509 having a severity level value 6. In another example, event 508 may be correctly assigned security level value 7, but event 509 may have an erroneous security level value that causes the analyst to incorrectly evaluate event 509 prior to event 508.

In another example, threat case load 522 may include security events, most of which are assigned a severity level value 5 or less. However, a single event 510 is assigned a security value 8, which identifies the event as including malware. However, event 510 should have been assigned a severity level value of 3 because the event is in fact benign. A guideline or predefined ruleset 226 may establish that an analyst is not to evaluate the events of a test case if all of the events have a severity level value of 5 or less. However, since event 510 is part of the test case load 522 and has a severity level value 8, the analyst is required to evaluate the events in the test case load 522, notwithstanding that event 510 is assigned in inappropriate value.

The security alert prioritization system 212 can valuate and rerank the security events in the two threat case loads 521, 522 according to the foregoing embodiments. With regard to threat case load 521, the security alert prioritization system 212 can accurately prioritize the events in threat case load 521 so that the event 508 is assigned a correct security level value of 4 instead of 7 so that event 509 is prioritized over event 508. In another example, the security alert prioritization system 212 can identify event 508 as a new event and assign the event 508 with an accurate security level 7 so that event 508 can be evaluated by the analyst prior to other events in the threat case load 521.

With regard to threat case load 522, the security alert prioritization system 212 can change the value of the event 510 to a severity level value 4 resulting in the test case load 522 to have events each assigned a severity level value 5 or less, resulting the test case load 522 to be closed (512).

Figure 6:
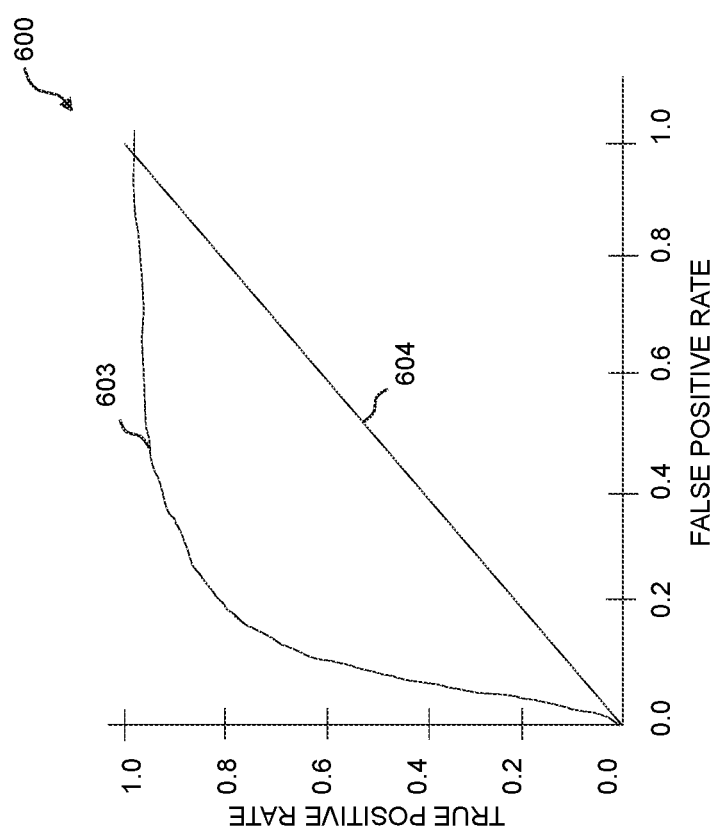
FIG. 6 is a graph comparing case-level receiver operating characteristic (ROC) curves.

FIG. 6 is a graph 600 of a case-level receiver operating characteristic (ROC) curve produced by an example embodiment. Graph 600 includes a plot comparing the suppression of false positives by the security alert prioritization system 212 and a baseline graph 604.

Figure 7:
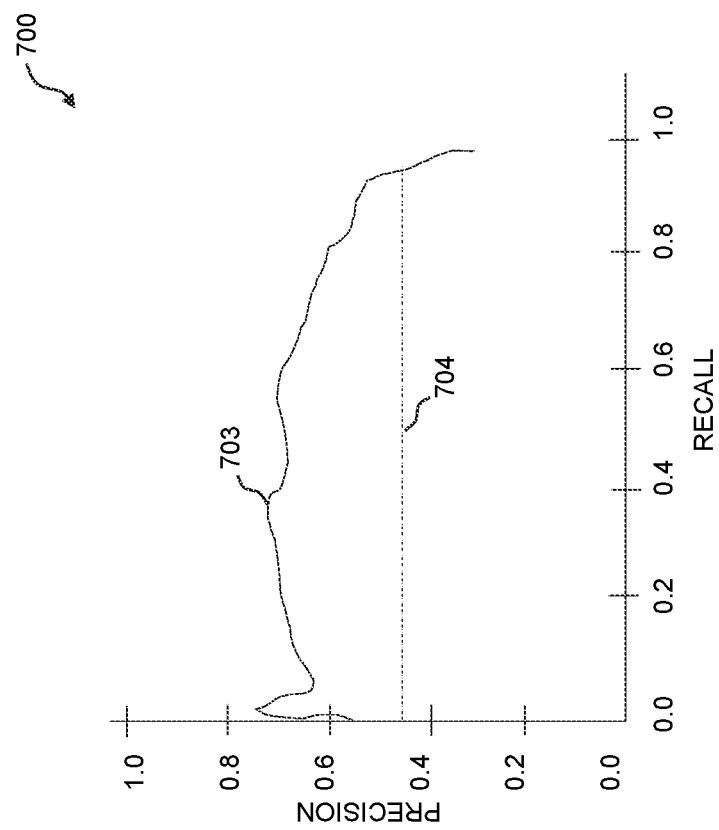
FIG. 7 is a graph comparing case-level precision-recall curves.

FIG. 7 is a graph 700 of a case-level precision-recall curve produced by an example embodiment. Graph 700 includes a plot comparing an output by the ensemble model 315 of FIG. 3 and a baseline 704 including no model. The scores returned by a classifier trained by a machine learning algorithm executed by the machine learning module 306 of the security alert prioritization system 212. As shown high precision relates to a low false positive rate, and high recall relates to a low false negative rate. Illustrated in the graph 703 are scores for both show that the classifier is returning accurate results (high precision), as well as returning a majority of all positive results (high recall), as compared to the baseline graph 704.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes, systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policy to network traffic to prevent intrusion attempts to the containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for prioritizing security events, comprising:
receiving, by one or more processors of a computer system, a plurality of alerts generated by an endpoint agent response to a detected computer security activity;
extracting, by the one or more processors of a computer system, a plurality of feature vectors from the plurality of alerts;
computing, by the one or more processors of the computer system, a plurality of temporal features from the plurality of alerts, the temporal features including time pattern data of the detected computer security activity;
training, by the one or more processors of the computer system, a first classification model with the plurality of feature vectors;
training, by the one or more processors of the computer system, a second classification model with the plurality of temporal features;
combining, by the one or more processors of the computer system, the first classification model and the second classification model to form an ensemble model that processes an output of each of the first classification model and the second classification model to generate a computed feature result;
generating by the ensemble model from the computed feature result an alert-level risk score corresponding to a severity level value for each alert of the plurality of alerts; and
arranging the plurality of alerts for output to an analyst computer according to the alert-level risk scores.

2. The method of claim 1, further comprising:
aggregating, by the one or more processors of the computer system, the plurality of alert risk scores to generate an incident-level score; and
performing, by the one or more processors of the computer system, a prioritization operation in response to the incident-level score.

3. The method of claim 2, further comprising:
outputting, by the one or more processors of the computer system, analyst feedback data generated in response to the incident-level score to a storage device including the alerts;
modifying the alerts to include the analyst feedback data; and
retraining a combination of the first classification model, the second classification model, and the ensemble model with the modified alerts.

4. The method of claim 2, wherein the prioritization operation includes suppressing an incident in response to the incident-level score less than a threshold value.

5. The method of claim 2, wherein the prioritization operation includes ranking alerts of the arrangement of the plurality of alerts within an incident according to the alert-level risk scores.

6. The method of claim 5, further comprising:
receiving, by the one or more processors of the computer system, a plurality of security events in a threat case;
associating the alert-level risk score with one of the security events of the detected computer security activity; and
arranging the alerts so that a priority identification of the one of the security events is higher than the other events of the plurality of security events in the threat case.

7. The method of claim 1, wherein each alert includes a current security level value, and the method further includes retraining a combination of the first classification model, the second classification model, and the ensemble model to change the current security level value to the alert-level risk score.

8. The method of claim 1, further comprising:
receiving, by the one or more processors of the computer system, a plurality of security events in a threat case for receipt by the analyst computer; and
associating the alert-level risk score with the at least one of the security events to change a state of the threat case.

9. The method of claim 1, wherein the plurality of alerts has a semi-structured format, and wherein the method further comprises:
extracting, the plurality of feature vectors validates contents of the alerts from the semi-structured format.

10. A computer system, comprising:
one or more memory devices coupled to one or more processors storing program code executable by the one or more processors; and
one or more processors that, having executed the program code, configure the computer system to perform a plurality of operations comprising:
receiving a plurality of alerts generated by an endpoint agent in response to a detected computer security activity;
extracting a plurality of feature vectors from the plurality of alerts;
computing a plurality of temporal features from the plurality of alerts, the temporal features including time pattern data of the detected computer security activity;
training a first classification model with the plurality of feature vectors;
training a second classification model with the plurality of temporal features;
combining the first classification model and the second classification model to form an ensemble model that processes an output of each of the first classification model and the second classification model to generate a computed feature result;
generating by the ensemble model from the computed feature result an alert-level risk score corresponding to a severity level value for each alert of the plurality of alerts; and
arranging the alerts for output to an analyst computer according to the alert-level risk scores.

11. The computer system of claim 10, wherein the method further comprises:
aggregating the plurality of alert risk scores to generate an incident-level score; and
performing a prioritization operation in response to the incident-level score.

12. The computer system of claim 11, wherein the method further comprises:
outputting feedback data generated in response to the incident-level score to a storage device including the alerts;
modifying the alerts to include the analyst feedback data; and
retraining a combination of the first classification model, the second classification model, and the ensemble model with the modified alerts.

13. The computer system of claim 10, wherein each alert includes a current security level value, and the method further includes retraining a combination of the first classification model, the second classification model, and the ensemble model to change the current security level value to the alert-level risk score.

14. The computer system of claim 13, wherein the method further comprises:
receiving a plurality of security events in a threat case; and
associating the alert-level risk score with one of the security events of the detected computer security activity; and
arranging the alerts so that a priority identification of the one of the security events is higher than the other events of the plurality of security events in the threat case.

15. The computer system of claim 10, wherein the method further comprises:
receiving, by the one or more processors of the computer system, a plurality of security events in a threat case;
associating the alert-level risk score with one of the security events of the detected computer security activity; and
arranging the alerts so that a priority identification of the one of the security events is higher than the other events of the plurality of security events in the threat case.

16. A computer program product for prioritizing security events, the computer program product comprising non-transitory computer-readable program code executable by one or more processors of a computer system to cause the computer system to perform a plurality of operations comprising:
receiving a plurality of alerts generated by an endpoint agent in response to a detected computer security activity;
extracting a plurality of feature vectors from the plurality of alerts;
computing a plurality of temporal features from the plurality of alerts, the temporal features including time pattern data of the detected computer security activity;
training a first classification model with the plurality of feature vectors;
training a second classification model with the plurality of temporal features;
combining the first classification model and the second classification model to form an ensemble model that processes an output of each of the first classification model and the second classification model to generate a computed feature result;
generating by the ensemble model from the computed feature result an alert-level risk score corresponding to a severity level value for each alert of the plurality of alerts; and
arranging the alerts for output to an analyst computer according to the alert-level risk scores.

17. The computer program product of claim 16, further comprising:
aggregating the plurality of alert risk scores to generate an incident-level score; and
performing a prioritization operation in response to the incident-level score.

18. The computer program product of claim 16, further comprising:
outputting feedback data generated in response to the incident-level score to a storage device including the alerts;
modifying the alerts to include the analyst feedback data; and retraining a combination of the first classification model, the second classification model, and the ensemble model with the modified alerts.

19. The computer program product of claim 16, wherein each alert includes a current security level value, and the method further includes retraining a combination of the first classification model, the second classification model, and the ensemble model to change the current security level value to the alert-level risk score.

20. The computer program product of claim 16, further comprising:
- receiving a plurality of security events in a threat case; and
- associating the alert-level risk score with one of the security events of the detected computer security activity; and
- arranging the alerts so that a priority identification of the one of the security events is higher than the other events of the plurality of security events in the threat case.

* * * * *